Sept. 22, 1964         W. H. MORONG, JR., ETAL         3,150,317
                  SINGLE STATOR THREE-PHASE NETWORK
                      INDUCTION WATTHOUR METER
Filed March 28, 1961                                 2 Sheets-Sheet 1
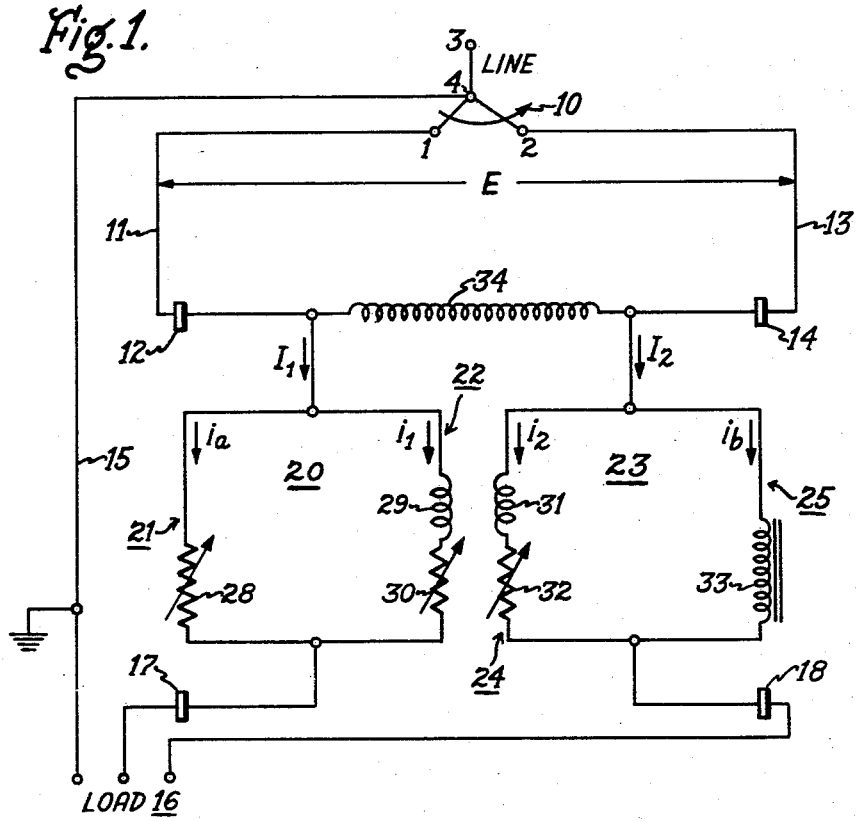
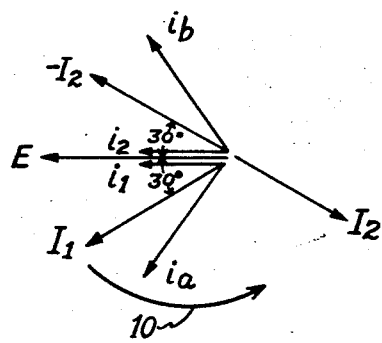
Inventors,
William H. Morong, Jr.,
John F. Scamman,
Clifton H. Clarke, Jr.,
by Francis K. Doyle
Their Attorney.

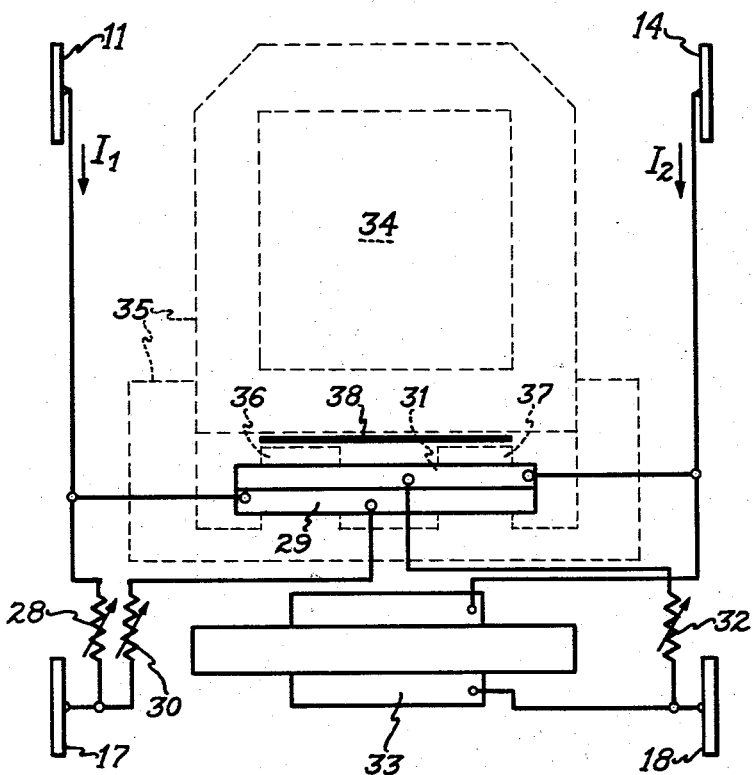

United States Patent Office 3,150,317
Patented Sept. 22, 1964

3,150,317
SINGLE STATOR THREE-PHASE NETWORK INDUCTION WATTHOUR METER
William H. Morong, Jr., South Berwick, Maine, John F. Scamman, Dover, N.H., and Clifton A. Clarke, Jr., South Berwick, Maine, assignors to General Electric Company, a corporation of New York
Filed Mar. 28, 1961, Ser. No. 98,803
5 Claims. (Cl. 324—107)

This invention relates generally to an improvement in induction watthour meters and, more particularly to an improved single stator network meter which can be used for measuring electrical energy in two phases of a 4-wire Y-connected, three-phase power distribution system.

The three-phase, 4-wire system may be used in large cities for low voltage distribution with 208 volts provided between phases for utilization as a source of power for air conditioners and the like. At the same time, lighting loads can be supplied with 120 volts by connecting between one phase and the neutral.

Conventional single-stator, 3-wire 120/240 volt, single-phase watthour meters cannot be used to measure network power, for although such meters will correctly measure any 208 volt line-to-line power loads, the registration of the meter will be only 75% of the true value for any 120 volt line-to-neutral lighting loads. This results from the fact that the line-to-neutral loads will be metered at 208 volts and at a 30° phase displacement or at a power factor of 0.866 instead of at unity power factor—thereby registering only 75% of the true value.

Heretofore, a fully compensated single-stator induction watthour meter for measurement of energy in two phases of a 4-wire, Y-connected, three-phase system has been disclosed; see, for example, U.S. Patent 2,930,979. Subsequent to the development of that meter, engineering endeavors have been aimed at improving such a meter by making it less subject to error, more compact, and less costly to produce.

It is an object of this invention to provide an improved, fully compensated single-stator induction watthour meter for measurement of energy in two phases of a 4-wire, Y-connected, three-phase system.

It is a further object of this invention to reduce the number of component parts making up such a meter.

It is also an object of this invention to provide a meter of compact and error reducing construction.

Briefly, the invention comprises the use of special phase shifting circuits connected to each of the current coils of a single-stator, three-wire meter. Such circuits include a novel arrangement of resistors which can be adjusted to obtain balance between the currents in the two phases, proper phase displacement of the currents in each current coil, and lag compensation for the meter.

The invention which is sought to be protected will be particularly pointed out in the claims which are appended to this specification. However, it is believed that this invention and the manner in which the various objects are obtained, as well as other objects and advantages, will be better understood from the following description, taken in conjunction with the accompanying drawings, in which:

FIGURE 1 is a schematic diagram of the improved single-stator network meter, showing the connections of the meter in two phases of a 4-wire, Y-connected, three-phase system;

FIGURE 2 is a vector diagram illustrating the current phases in the meter; and

FIGURE 3 is a schematic diagram of the structural arrangement of a meter according to the invention.

Referring to FIGURE 1, there is shown a schematic diagram of a network meter in accordance with the invention, along with the necessary connections to only two phases of a 4-wire, Y-connected, three-phase power generating system. The phases comprising the network system are designated 1, 2 and 3, with the arrow 10 showing the phase sequence in the system. Conductors are connected only to two phases, 1 and 2 for example, as well as to the neutral line 4. The voltage across the two phases in the system is designated as E and normally has a magnitude of 208 volts. In this type of system, the line to neutral voltage in either phase is 120 volts. Phase 1 of the system is connected by the lead 11 to one of the line terminals 12 of the meter, and phase 2 of the system is connected by the lead 13 to the other line terminal 14 of the meter. A lead 15 connects the neutral line 4 of the system to the appropriate load circuit 16. The terminals 17 and 18 of the meter provide loadside connections to phases 1 and 2.

Within the meter the phase 1 current is directed through a phase shifting circuit 20 which comprises parallel branches 21 and 22. The current of phase 1, which is indicated as $I_1$, is divided by the parallel branches 21 and 22 into currents $i_a$ and $i_1$ respectively. In a similar manner, a phase shifting circuit 23 is provided for the current $I_2$ of phase 2, which consists of parallel branches 24 and 25 through which currents $i_2$ and $i_b$ respectively flow.

Parallel branch 21 of phase shifting circuit 20 has, as its sole compent, an adjustable resistor 28. Parallel branch 22 has as its components a current coil 29 and an adjustable resistor 30. Parallel branch 24 of phase shifting circuit 23 has as its components a current coil 31 and an adjustable resistor 32, while parallel branch 25 has as its sole component an iron core inductor 33. In addition to the foregoing components, a voltage coil 34 is provided which is connected across phase 1 and phase 2. Suitable core structure, not shown in FIGURE 1, is provided to interrelate the fluxes produced by the voltage coil 34 and the current coils 29 and 31 of the meter. FIGURE 3 of the drawings shows the interrelation of coils 29, 31 and 34, to be later described in more detail.

In order to produce a torque in a single-stator, watthour meter which will correctly reflect the power in the network, the currents $i_1$ and $i_2$ in the current coils 29 and 31, respectively, must be brought into proper phase relationship with each other and with the phase of the voltage vector E. Since the two phases are a part of a three-phase system, the phase currents $I_1$ and $I_2$ are normally displaced 120° from each other. As is well shown to one skilled in the art, the displacement of the two current phases can be reduced to 60° by winding the current coil 29 in one direction and the current coil 31 in the reverse direction. This initial and final relationship of the currents and voltage is graphically illustrated in FIGURE 2.

As FIGURE 2 also shows, the currents $i_1$ and $i_2$ are brought into alignment with the voltage vector E by splitting the phase currents $I_1$ and $I_2$ into the components $i_1$ and $i_a$, and $i_2$ and $i_b$ respectively. It is evident from FIGURE 2 that the phase current $I_1$ leads the voltage E, and the phase current $I_2$ lags the voltage E. It is well known that the addition of inductance to an electrical circuit tends to cause the current in that circuit to lag the voltage. For this reason, the watthour meter disclosed in the previously mentioned U.S. Patent 2,930,979 utilized an iron core inductor in series with the current coil in the leading phase, and a similar iron core inductor in series with the adjustable resistor in the branch of the lagging phase not having a current coil, in order to cause these component currents to lag the respective phase currents. In FIGURE 2 of the drawing, it can be seen that it is necessary to cause the current $i_1$ to lag its phase current $I_1$ and, in a similar manner, it is necessary that the current $i_b$ lag its phase current $I_2$; the latter in order to cause the current $i_2$ to lead the phase current $I_2$. Comparison of the respective Figures 1 of both this application and the previously indicated patent will show that the components in phase shifting circuits are not the same.

The first improvement of the single-stator, watthour network meter of the invention is the elimination of the adjustable resistor in branch 25 of the phase shifting circuit 23. Since this branch has an inherent fixed resistance, adjustment of the adjustable resistors 28, 30 and 32 in the other three branches of both phase shifting networks 20, and 23, and adjustment of the damping magnet of the meter, not shown, yet conventional, still allows calibration of the meter. The elimination of the adjustable resistor in branch 25 reduces the amount of reactance necessary to effect a given phase shift in that branch. Fewer reactor turns on the iron core inductor 33 are therefore required, further lowering the resistance of branch 25. Reduction of the resistance in branch 25 would enable a similar reduction of resistance in the branch 24 in order to maintain the same division of current. However, the smaller the current in branch 24, the less the amount of lagging required in branch 25. Thus, by making $i_2$ equal to approximately one-third of $I_2$ in magnitude, instead of one-half, the inductance of reactor 33 may be further reduced. This requires an increase in the number of turns in current coil 31 to provide the desired ampere turns. While the increase of turns in coil 31 increases the inductance in branch 24, the decrease of inductance in coil 33 results in a better balanced phase shifting circuit, having smaller losses than previously obtainable.

Since the current coils 29 and 31 are wrapped around the same core, and are therefore inductively coupled, the effects of the change in the circuit components of the phase shifting circuit 23 are reflected into the phase shifting circuit 20. The resultant effect in branch 22 of the phase shifting circuit 20 is one of increased lagging which therefore reduces the amount of inductance necessary in branch 22 to effect the alignment of the branch current $i_1$ with the voltage vector E. This lessening of the inductance in branch 22 reduces the resistance of branch 22 and makes possible a similar reduction of resistance in branch 21 to maintain the proper division of current.

Since the reactance required in the parallel branch 22 is decreased, the iron core inductor previously used in this branch is entirely eliminated and the necessary reactance to bring the branch current $i_1$ in line with the voltage vector E is achieved by the turns of the current coil 29. As will be well understood, the lower resistance in the current circuit branches results in lower $I^2R$ losses, and lower temperature rise. This reduces the heat of the various components, resulting in reduced error due to internal heat. It will, also, be clear that the reduced temperature rise lowers the thermal requirement of the meter insulation.

Referring now to FIGURE 3, in which the same numerals have been used to designate the same elements represented in FIGURE 1, a schematic representation of a portion of the meter structure is shown. A single laminated core structure 35, shown in broken lines, is provided, which supports the voltage coil 34 and the current coils 29 and 31. The upper half of the core structure 35, together with the voltage coil 34, makes up the voltage electromagnet, and the lower half of the core structure 35, together with the current coils 29 and 31, comprises the current electromagnet having two poles 36 and 37. Between the poles of the current electromagnet and the voltage electromagnet an air gap is provided in which the induction disc rotor 38 may rotate. The single-stator core structure 35 may be of the same configuration as has been previously utilized in a single-stator type meter. In the previously mentioned Patent 2,930,979, two iron core reactors were necessary. These were located immediately behind the voltage electromagnet. However, only the single iron core reactor 33 is necessary in the meter arrangement of this invention and, as FIGURE 3 shows, it has been located so that the current electromagnet is positioned between it and the voltage electromagnet. This relocation of the iron core reactor 33 is advantageous, not only for the obvious reason of permitting a meter structure which is more compact, but also because it minimizes the effects of leakage flux between the reactor 33 and the voltage electromagnet. This leakage flux previously had caused large unidirectional torques on the rotor which varied from meter to meter. With the location of the iron core reactor 33 of this invention, the effects of leakage flux appear to be fairly uniform for all meters.

It will be understood that the structure of the meter of this invention remains substantially the same as that of the meter described in U.S. Patent 2,930,979, with the exception of those changes which are herein described.

While a particular embodiment of an improved single-stator network meter employing this invention has been shown and described, it will be obvious that changes and modifications can be made without departing from the spirit of the invention and the scope of the appended claims.

What is claimed as new and desired to be secured by Letters Patent of the United States is:

1. An induction watthour meter for measuring electrical energy in two phases of a 4-wire, Y-connected, three-phase power distribution system comprising; a stator assembly including voltage and current electromagnets, having poles separated by an air gap, an induction disc rotor journaled for rotation in said air gap, said voltage electromagnet including a voltage winding connectable across said two phases, said current electromagnet including first and second current coils, said first current coil being connectable in one of said two phases and said second current coil being connectable in the other of said two phases, first and second phase shifting circuits connected to said first and second current coils respectively, said first phase shifting circuit comprising first and second parallel branches, said second phase shifting circuit comprising third and fourth parallel branches, said first branch having an adjustable resistor as its sole component, said second branch containing only an adjustable resistor in series with said first current coil, said third branch comprising an adjustable resistor in series with said second current coil, and said fourth branch having an iron core inductor as its sole component.

2. A meter as defined in claim 1 wherein said current electromagnet is positioned between said voltage electromagnet and said iron core inductor to thereby lessen the effects of leakage flux between said iron core inductor and said voltage electromagnet.

3. An induction watthour meter for measuring electrical energy in two phases of a 4-wire, Y-connected, three-phase power distribution system comprising; a stator assembly including voltage and current electromagnets, having poles separated by an air gap, an induction disc rotor journaled for rotation in said air gap, said voltage electromagnet including a voltage winding connectable across said two phases, said current electromagnet including first and second current coils, said first current coil being connectable in one of said two phases and said second current coil being connectable in the other of said two phases, first and second phase shifting circuits connected to said first and second current coils respectively, said first phase shifting circuit comprising first and second parallel branches, said second phase shifting circuit comprising third and fourth parallel branches, said four parallel branches containing a total of three adjustable resistors, and a total of one iron core reactor, said iron core reactor being the sole component of one of said four parallel branches, said first current coil being connected in one of said first and second parallel branches and in series with one of said three adjustable resistors and said second current coil being connected in one of said third and fourth parallel branches and in series with another of said three adjustable resistors, whereby calibration of said phase shifting circuits require few adjustments.

4. An induction watthour meter as claimed in claim 3 in which said reactor is located remote from said voltage electromagnet to minimize the effect of leakage flux therebetween.

5. An induction watthour meter for measuring electrical energy in two phases of a 4-wire, Y-connected, three-phase power distribution system comprising; a stator assembly including voltage and current electromagnets, having poles separated by an air gap, an induction disc rotor journaled for rotation in said air gap, said voltage electromagnet including a voltage winding connectable across said two phases, said current electromagnet including first and second current coils, said first current coil being connectable in one of said two phases and said second current coil being connectable in the other of said two phases, first and second phase shifting circuits connected to said first and second current coils respectively, said first phase shifting circuit comprising first and second parallel branches, said first branch having an adjustable resistor as its sole component, said second branch containing only an adjustable resistor in series with said first current coil, said second phase shifting circuit comprising third and fourth parallel branches, said third branch containing an adjustable resistor in series with said second current coil, and said fourth branch having an iron core inductor as its sole component, the resistance in said third branch being adjusted to provide a current flow in said third branch which is approximately ⅓ of the total current flow in both said third and said fourth branches, said current coil in said third branch being provided with sufficient turns to provide the necessary ampere turns for measuring the electric energy, to thereby improve the balance of said second phase shifting circuit.

References Cited in the file of this patent

UNITED STATES PATENTS

| | | |
|---|---|---|
| 2,546,693 | Jauss | Mar. 27, 1951 |
| 2,930,979 | Clarke | Mar. 29, 1960 |